United States Patent [19]

Meier et al.

[11] Patent Number: 4,710,529
[45] Date of Patent: Dec. 1, 1987

[54] STABILIZED THERMOPLASTIC MOULDING MATERIALS BASED ON ABS POLYMERS AND ACYL PHOSPHANOXIDES

[75] Inventors: Helmut-Martin Meier, Ratingen; Hans-Georg Heine, Krefeld; Alfred Pischtschan, Kuerten; Rolf Dhein; Hans Rudolph, both of Krefeld, all of Fed. Rep. of Germany

[73] Assignee: Bayer Aktiengesellschaft, Leverkusen, Fed. Rep. of Germany

[21] Appl. No.: 938,141

[22] Filed: Dec. 4, 1986

[30] Foreign Application Priority Data

Dec. 13, 1985 [DE] Fed. Rep. of Germany ....... 3544000

[51] Int. Cl.$^4$ ..................... C08F 220/44; C08F 257/02
[52] U.S. Cl. .................................................. 524/139
[58] Field of Search .................... 524/115; 525/63; 528/398; 521/139; 522/64

[56] References Cited

U.S. PATENT DOCUMENTS

| | | | |
|---|---|---|---|
| 3,636,035 | 1/1972 | Mauz et al. | 524/710 |
| 3,837,903 | 9/1974 | Jones | 428/289 |
| 4,265,723 | 5/1981 | Hesse et al. | 522/64 |
| 4,381,359 | 4/1983 | Idel et al. | 524/117 |
| 4,425,287 | 1/1984 | Hesse et al. | 522/107 |
| 4,447,520 | 5/1984 | Henne et al. | 522/103 |
| 4,493,807 | 1/1985 | Vyvial et al. | 264/102 |

Primary Examiner—Joseph L. Schofer
Assistant Examiner—Angela L. Fugo
Attorney, Agent, or Firm—Connolly and Hutz

[57] ABSTRACT

The use of acyl phosphanoxides of the formula I

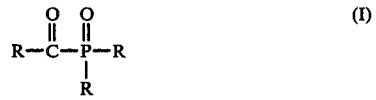

in which
each R, independently of the others, can denote linear or branched $C_1$–$C_{12}$-alkyl, cycloalkyl or optionally mono- or poly-$C_1$–$C_{12}$-alkyl-substituted, alkoxy-substituted or halo-substituted aryl or phenyl, for improvement of the mechanical properties in ABS moulding materials.

8 Claims, No Drawings

STABILIZED THERMOPLASTIC MOULDING MATERIALS BASED ON ABS POLYMERS AND ACYL PHOSPHANOXIDES

In the context of this invention, ABS plastics are produced by polymerization from resin-forming monomers in the presence of a rubber. During this, a part of the resin-forming monomer is polymerized and simultaneously chemically bonded to the rubber, and another part is polymerized separately. This mixture is designated as a graft polymer and already represents an ABS plastic. Further resin, that is to say free polymer from resin-forming monomers, can be added to such graft polymers and the properties can thereby be altered. These products are also designated at ABS plastic. The term "ABS", which originally designated graft polymers from styrene and acrylonitrile on polybutadiene, is thus now used for all resin-forming monomers and all rubbers.

It has been found that addition of acyl phosphanoxides of the formula I

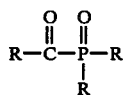

in which
each R, independently of the others, can denote linear or branched $C_1$-$C_{12}$-alkyl, cycloalkyl or optionally mono- or poly-$C_1$-$C_{12}$-alkyl-substituted, alkoxy-substituted or halo-substituted aryl or phenyl,
considerably improves the thermal and oxidation stability and also the impact strength of ABS plastics.

The invention thus relates to thermoplastic moulding materials from ABS, which are characterized in that they contain 0.01–5% by weight of acyl phosphanoxides of the formula (I)

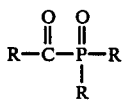

in which
each R, independently of the others, can denote linear or branched $C_1$-$C_{12}$-alkyl, cycloalkyl or optionally mono- or poly-$C_1$-$C_{12}$-alkyl-substituted, alkoxy-substituted or halo-substituted aryl or phenyl.

In particular, the invention relates to thermoplastic moulding materials containing:
I. an ABS polymer of the following composition:
A. 5–100% by weight, preferably 5–80% by weight, of a graft polymer prepared by graft polymerization from
A1 10–95% by weight, preferably 10–80% by weight, of a mixture of
A1.1 50–90% by weight of styrene, α-methylstyrene, nuclear-substituted styrene or methyl methacrylate, or mixtures thereof, and
A1.2 50–10% by weight of (meth)acrylonitrile, methyl methacrylate, maleic anhydride, N-substituted maleinimide, or mixtures thereof, on
A2 90–5% by weight, preferably 90–20% by weight, of a rubber having a glass transition temperature $T_G \leq 0°$ C. and
B. 95–0% by weight, preferably 95–20% by weight, of a thermoplastic copolymer from
B1. 90–50% by weight of styrene, α-methylstyrene, nuclear-substituted styrene or methyl methacrylate, or mixtures thereof, and
B2. 50–0% by weight of (meth)acrylonitrile, methyl methacrylate.maleic anhydride, N-substituted maleinimide and mixtures thereof,
II. 0.05–2.0 parts by weight, relative to 100 parts by weight, of (I), of an acyl phosphanoxide of the formula (I) with the above-mentioned meanings for the radicals R.

Preferred amounts of acyl phosphanoxide of the formula (I) are 0.2–1.0 part by weight, relative to 100 parts by weight of (I).

Temperatures up to 300° C. can occur during the processing of such mixtures, particularly to form large-surface-area parts. Surface flaws can thereby occur in the form of bubbles or waviness and streaks and marked yellow to brown discolorations.

By means of addition of acyl phosphanoxides of the formula (I), ABS polymer moulding materials are obtained which display markedly less yellow to brown coloration at all processing temperatures than does unstabilized or conventionally stabilized material. In addition, improved impact strength arises, which was also not to be expected from the state of the art.

The use of trimethylbenzyldiphenyl phosphanoxide as a photoinitiator in a mixture of a partially saponified polyvinyl acetate and hydroxyalkyl methacrylate is known from EP-A No. 80,664. According to EP-A Nos. 23 634, 73 413 and 62 839, acyl phosphanoxides are also known as photoinitiators for unsaturated polyester resins.

Esters of phosphorous acid have been proposed as thermostabilizers for ABS according to EP-A No. 23 291. The use of acyl phosphanoxides in thermoplastic moulding materials of ABS plastics is novel and leads to unexpected property improvements.

The action of acyl phosphanoxides of the formula

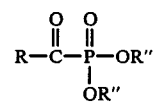

where
R"=alkyl and
R=aryl,
for example diethyl benzoylphosphonate, actually cause a colour deterioration in ABS polymers.

The ABS polymers stabilized according to the invention can contain 5–100% by weight of a graft polymer (A) and 95–0% by weight of a thermoplastic copolymer (resin) (B).

Graft polymers (A) in the context of the invention are those in which either a monomer from the group comprising styrene and methyl methacrylate or a mixture of monomers comprising 95–50% by weight of styrene, α-methyl styrene, nuclear-substituted styrene, methyl methacrylate or mixtures thereof and 5–50% by weight of (meth)acrylonitrile, maleic anhydride, N-substituted maleimides or mixtures thereof are graftpolymerized onto a rubber. Suitable rubbers are, in particular, polybutadiene, butadiene/styrene copolymers having up to 30% by weight of a lower alkyl ester of acrylic or meth-acrylic acid (for example methyl acrylate, ethyl acrylate, methyl methacrylate and ethyl methacrylate).

Further suitable rubbers are, for example, polyisoprene or polychloroprene. Also suitable are alkyl acrylate rubbers based on $C_1$–$C_8$-alkyl acrylates, particularly ethyl, butyl and ethylhexyl acrylate. These alkyl acrylate rubbers can, if appropriate, contain, copolymerized, up to 30% by weight of monomers, such as vinyl acetate, acrylonitrile, styrene, methyl methacrylate and vinyl ethers.

These alkyl acrylate rubbers can furthermore contain relatively small amounts (up to 5% by weight) of ethylenically unsaturated monomers which cause cross-linking. Such monomers are, for example, alkylenediol di-(meth)-acrylates, polyester di-(meth)-acrylates, di- and tri-vinylbenzene, triallyl cyanurate, allyl (meth)-acrylate, butadiene, isoprene etc. Such alkyl acrylates are known. Acrylate rubbers as graft bases can also be products which contain a crosslinked diene rubber from one or more conjugated dienes, such as polybutadiene, or a copolymer of a conjugated diene with an ethylenically unsaturated monomer, such as styrene and/or acrylonitrile, as nucleus.

Diene rubbers are preferred.

The graft copolymers (A) contain 10–95% by weight, particularly 20–70% by weight, of rubber and 90–5% by weight, particularly 80–30% by weight, of graft copolymerized monomers. The rubbers are present in these graft copolymers in the form of at least partially crosslinked particles of a mean particle diameter ($d_{50}$) of 0.09 to 5 μm, particularly from 0.1–1 μm. Such graft copolymers can be prepared by free-radical graft copolymerization of monomers from the group comprising styrene, α-methylstyrene, nuclear-substituted styrene, (meth)acrylonitrile, methyl methacrylate, maleic anhydride and N-substituted maleimide, in the presence of the rubber to be grafted. Preferred preparation processes for such graft copolymers are emulsion polymerization, solution polymerization, bulk polymerization or suspension polymerization.

The copolymers (B) can be built up from the graft monomers for (A) or similar monomers, particularly from at least one monomer from the group comprising styrene, α-methylstyrene, halostyrene, acrylonitrile, methacrylonitrile, methyl methacrylate, maleic anhydride, vinyl acetate and N-substituted maleimide. They are preferably copolymers from 95–50% by weight of styrene, α-methylstyrene, methyl methacrylate or mixtures thereof with 5–50% by weight of acrylonitrile, methacrylonitrile, methyl methacrylate, maleic anhydride or mixtures thereof. Such copolymers are also produced as byproducts in graft copolymerization. It is customary to add copolymers which have been prepared separately in addition to the copolymers contained in the graft polymer.

These must not be chemically identical to the ungrafted resin components present in the graft polymers.

Suitable copolymers which have been prepared separately are resinous, thermoplastic and rubber-free; they are, in particular, copolymers from styrene and/or α-methylstyrene with acrylonitrile, if appropriate in mixtures with methyl methacrylate. Particularly preferred copolymers comprise 20–40% by weight of acrylonitrile and 80–60% by weight of styrene or α-methylstyrene. Such copolymers are known and can be prepared, in particular, by free-radical polymerization, particularly by emulsion polymerization, suspension polymerization, solution polymerization or bulk polymerization.

The copolymers preferably have molecular weights from 15,000 to 200,000.

The acyl phosphanoxides of the general formula

　(I)

are known from the literature, or can be prepared by processes which are known from the literature (DOS (German Published Specification) No. 3,139,984). For this purpose, an acyl halide of the formula II

　(II)

is reacted with an alkoxyphosphine of the formula III

　(III)

in equimolar amounts at 20°–150° C., if appropriate in an inert organic solvent, removing the alkyl halide formed.

In the formulae I, II and III,

R represents, independently of one another: linear or branched $C_1$–$C_{12}$-alkyl, such as methyl, ethyl, propyl, isopropyl, butyl, pentyl, hexyl, heptyl, isooctyl, nonyl, decyl, undecyl or dodecyl, cycloalkyl (for example having 5–7 C atoms), such as cyclopentyl, cyclohexyl or cyclododecyl, $C_1$–$C_{12}$-alkyl-substituted or halo-substituted aryl (for example having 6–20 C, atoms), such as phenyl, o-tolyl, p-tolyl, 2,4,6-trimethylphenyl, nonylphenyl, p-tert.-butylphenyl, 2-cyclohexyl-4-methylphenyl, 2,4-di-tert.-butylphenyl, naphthyl, 2-chlorophenyl, 4-chlorophenyl, 2,6-dichlorophenyl, 2,6-dimethoxyphenyl, 2,4,6-tribromophenyl, or pentachlorophenyl, and X represents chlorine, bromine, iodine or fluorine.

2,4,6-trimethylbenzoyl-diphenyl phosphanoxide is particularly preferred.

The stabilizers according to the invention can be incorporated into the moulding materials in any desired fashion. For example, the melts can be compounded at temperatures from 180°–220° C. in conventional equipment such as internal mixers, extruders or twin-screw compounders. In this case, the stabilizers can be employed in pure form or as a concentrate dissolved in one of the further components. They can also be added as early as during the preparation, for example as an aqueous emulsion to the latex of an ABS plastic.

In addition to the stabilizers according to the invention, the conventional additives, such as pigments, fillers, lubricants, mould release agents and the like can, of course, be added to the moulding materials. It is also possible to add further known stabilizers, for example cyclic phosphites.

The moulding materials of the present invention can be used for the production of moulded articles of any type. In particular, moulded articles can be produced by injection moulding. Examples of moulded articles which can be produced are: casing parts of any type (for example for household appliances, such as juice extractors, coffee machines, mixers) or access panels for the building industry and parts for the automotive industry. In addition, they are employed in electrical engineering, since they have very good electrical properties. A further form of processing is the production of moulded articles by deep drawing from previously prepared sheets or films.

Particle size always denotes mean particle diameter $d_{50}$, determined by ultracentrifuge measurements according to W. Scholtan et al. Colloids, u.Z. Polymere, 250 (1972) 782–796.

EXAMPLES

Polymers employed

A. SAN graft polymer of 50% by weight of styreneacrylonitrile mixture (in the weight ratio of 72:28) on 50% by weight of particulate polybutadiene of a mean particle size ($d_{50}$) of 0.4 μm, obtained by emulsion polymerization.

B. Styrene-acrylonitrile copolymer having a styreneacrylonitrile ratio of 70:30 and a limiting viscosity of $[\eta]=0.55$ dl/g (measurement in dimethylformamide at 20° C.).

A mixture of 40 parts by weight of A and 60 parts by weight of B was stabilized.

EXPERIMENTS A–F

The moulding materials were prepared by compounding the melts in a BANBURY internal mixer at a temperature of 200° C.

Sample plates measuring 60×40×2 mm were prepared for the determination of the brightness (crude tone) on the samples. The equipment used was a Monomat 25, the processing conditions being as follows:

| | |
|---|---|
| screw speed: | 100/min |
| injection rate: | 2.5 s |
| hold pressure: | 60 bar |
| residence time of the material in the machine: | 6.5 min. |

220°, 250° and 280° C. were selected as injection temperatures. The discoloration of the sample platelets obtained, dependent on the respective injection temperature and the type of stabilizer, are graded in Table 2. Table 1 contains the impact strength of the correspondingly stabilized materials.

The results clearly show that the addition of 4) (Experiment E) improves the colour tone of the moulding materials and their impact strength.

TABLE 1

| Experiment | ABS Polymer parts by weight | Stabilizers (parts by weight) | | | | | Notched impact strength at −40° C. (N/mm²) |
|---|---|---|---|---|---|---|---|
| | | (1) | (2) | (3) | (4) | (5) | |
| A | 100 | | | | | | 74 |
| B | 100 | 0.5 | | | | | 79 |
| C | 100 | | 0.5 | | | | 76 |
| D | 100 | | | 0.5 | | | 78 |
| E | 100 | | | | 0.5 | | 97 |
| F | 100 | | | | | 0.5 | 76 |

A, B, C, D, F: Comparison experiments
E: Experiment according to the invention

Stabilizers employed (1) 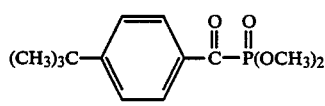

(2) 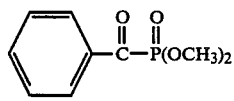

(3) 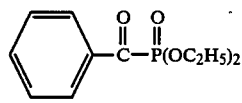

(4) 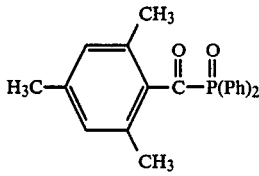

(5) 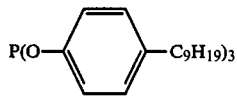

The following numerical values were allocated to the discolorations of the sample platelets:

| | |
|---|---|
| pale beige | 1 |
| beige | 2 |
| pale brown | 3 |
| brown | 4 |
| dark brown | 5 |

Table 2 (following) is thereby obtained.

| Injection temperature/experiment | A | B | C | D | E | F |
|---|---|---|---|---|---|---|
| 220° C. | 2 | 3 | 3 | 2 | 1 | 2 |
| 250° C. | 3 | 4 | 4 | 4 | 1 | 3 |
| 280° C. | 4 | 5 | 5 | 5 | 3 | 4 |

We claim:

1. A thermoplastic moulding material comprising ABS and containing, as stabilizer, an acyl phosphanoxide of the formula

(I)

wherein each R is linear or branched $C_1$–$C_{12}$ alkyl, $C_5$–$C_7$ cycloalkyl, aryl mono- or poly-substituted by $C_1$–$C_{12}$ alkyl, alkoxy substituted aryl, halo-substituted aryl or unsubstituted aryl and wherein the ABS is a polymer having the following composition:

A. 5–100% by weight of a graft copolymer prepared by graft polymerization from
  1. 10–95% by weight of a mixture from
    (i) 50–90% by weight of styrene, α-methylstyrene, nuclear-substituted styrene or methylmethacrylate or mixtures thereof and
    (ii) 50–10% by weight of (meth)acarylonitrile, methyl methacrylate, maleic anhydride, N-substituted maleimide or mixtures thereof, on
  2. 90–5% by weight of a rubber having a glass transition temperature $T_g \leq 0°$ C. and
B. 95–0% by weight of a thermoplastic copolymer from
  1. 90–50% by weight of styrene, α-methylstyrene, nuclear-substituted styrene or methyl methacrylate or mixtures thereof and
  2. 50–0% by weight of (meth)acrylonitrile, methyl methacrylate, maleic anhydride, N-substituted maleimide or mixtures thereof.

2. A thermoplastic moulding material according to claim 1, in which each R represents, independently of one another: methyl, ethyl, propyl, isopropyl, butyl, pentyl, hexyl, heptyl, isooctyl, nonyl, decyl, undecyl or dodecyl, cyclopentyl, cyclohexyl or cyclododecyl, phenyl, o-tolyl, p-tolyl, 2,4,6-trimethylphenyl, nonylphenyl, p-tert.-butylphenyl, 2-cyclohexyl-4-methylphenyl, 2,4-di-tert.-butylphenyl, naphthyl, 2-chlorophenyl, 4-chlorophenyl, 2,6-dichlorophenyl, 2,6-dimethoxyphenyl, 2,4,6-tribromophenyl, or pentachlorophenyl.

3. A thermoplastic moulding material according to claim 1, in which the acyl phosphanoxide of formula (I) is 2,4,6-trimethylbenzoyl-diphenyl phosphanoxide.

4. A thermoplastic moulding material according to claim 1 containing:
  I. an ABS polymer of the following composition:
    A. 5–100% by weight of a graft copolymer prepared by graft polymerization from
      1. 10–95% by weight of a mixture from
        (i) 50–90% by weight of styrene, α-methylstyrene, nuclear-substituted styrene or methylmethacrylate or mixtures thereof and
        (ii) 50–10% by weight of (meth)acrylonitrile, methyl methacrylate, maleic anhydride, N-substituted maleimide or mixtures thereof, on
      2. 90–5% by weight of a rubber having a glass transition temperature $T_g \leq 0°$ C. and
    B. 95–0% by weight of a thermoplastic copolymer from
      1. 90–50% by weight of styrene, α-methylstyrene, nuclear-substituted styrene or methyl methacrylate or mixtures thereof and
      2. 50–0% by weight of (meth)acrylonitrile, methyl methacrylate, maleic anhydride, N-substituted maleimide or mixtures thereof, and
  II. 0.05–2.0 parts by weight, relative to 100 parts by weight of the ABS polymer of component I of an acyl phosphanoxide of formula (I).

5. A thermoplastic moulding composition according to claim 4, containing 0.2 to 1.0 parts by weight of the acyl phosphanoxide, relative to 100 parts by weight of the ABS polymer of component I.

6. A thermoplastic moulding composition according to claim 4 in which the ABS polymer comprises 5 to 80% by weight of the graft polymer of component A. and 95 to 20% by weight of the thermoplastic copolymer of component B.

7. A thermoplastic moulding composition according to claim 4, in which the graft polymer of component A is prepared by graft polymerisation from 10 to 80% by weight of the mixture of component 1 on 90 to 20% by weight of the rubber of component 2.

8. A moulded article whenever formed of a moulding composition according to claim 1.

* * * * *